UNITED STATES PATENT OFFICE.

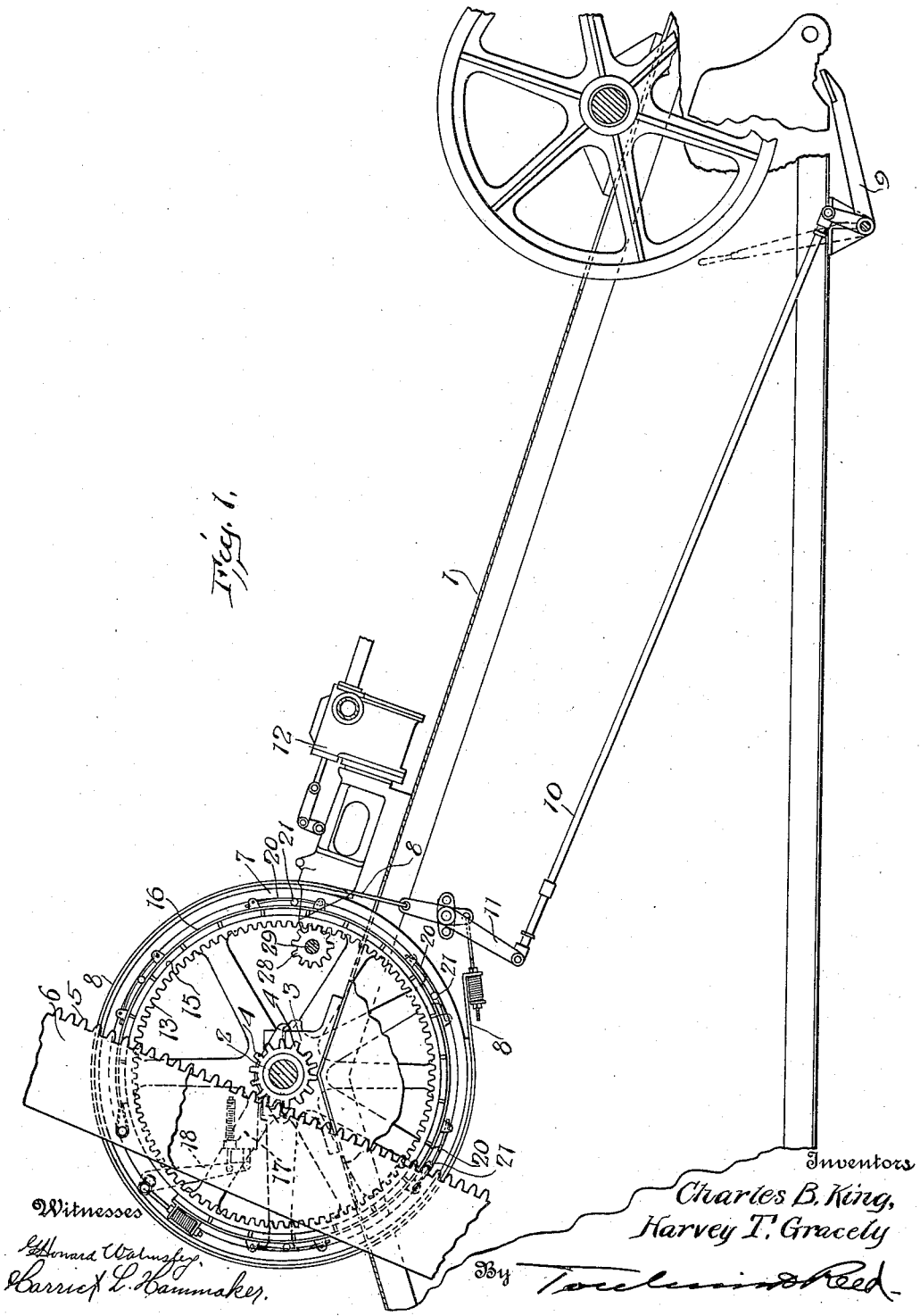

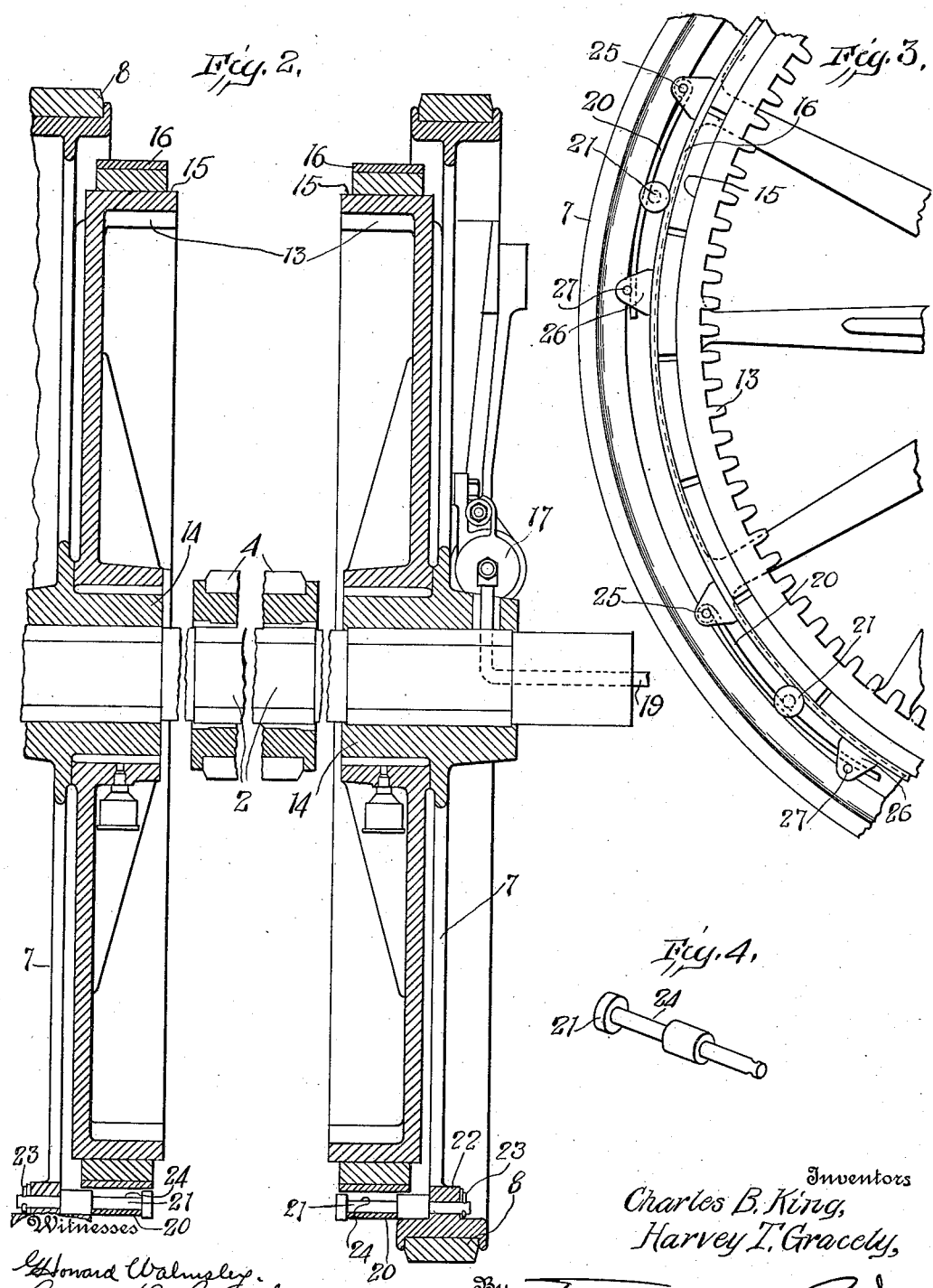

CHARLES B. KING AND HARVEY T. GRACELY, OF MARION, OHIO, ASSIGNORS TO THE MARION STEAM SHOVEL COMPANY, OF MARION, OHIO, A CORPORATION OF OHIO.

BRAKE MECHANISM FOR SHIPPER-SHAFTS.

1,162,074.  Specification of Letters Patent.  Patented Nov. 30, 1915.

Application filed June 29, 1911. Serial No. 635,999.

*To all whom it may concern:*

Be it known that we, CHARLES B. KING and HARVEY T. GRACELY, citizens of the United States, residing at Marion, in the county of Marion and State of Ohio, have invented certain new and useful Improvements in Brake Mechanism for Shipper-Shafts, of which the following is a specification, reference being had therein to the accompanying drawing.

This invention relates to controlling mechanism for the shipper-shaft of an excavating machine. As is well known in excavating machines of the boom and dipper type the shipper-shaft is mounted on the boom between the ends thereof, is operatively connected with the dipper handle and is actuated by a crowding engine, which is also mounted on the boom, to manipulate the dipper.

The object of the present invention is to provide controlling mechanism whereby the rotation of the shipper shaft may be controlled by a manually operated brake in the usual manner, by a crowding engine through suitable clutch connections or by both the manually operated brake and the engine; to provide a controlling mechanism which will permit of the rotation of the shipper-shaft without actuating the engine or the connecting devices therefor, thereby allowing the dipper to move down very rapidly without affecting the engine; and further, to provide a controlling mechanism which will be very flexible, thereby facilitating the manipulation and control of the dipper.

In the accompanying drawings, Figure 1 is a longitudinal, sectional view of a portion of a boom showing the invention applied thereto; Fig. 2 is a transverse, sectional view, taken centrally through the brake wheels and friction drums on one end of the shipper-shaft; Fig. 3 is a side elevation of a portion of the friction drum and brake wheel showing the releasing devices for the friction bands; and Fig. 4 is a detail view of one of the spring-supporting pins.

In these drawings we have illustrated one embodiment of our invention and have shown the same as applied to the boom 1 of a boom and dipper excavating machine.

The shipper-shaft, which is indicated at 2, is mounted in suitable bearings 3 on the boom and is provided near its center with pinions 4 to engage a rack 5 of the dipper handle 6.

Rigidly mounted on the shipper-shaft 2 is a controlling member 7 which preferably consists of a brake wheel having a brake band 8 extending about the periphery thereof and controlled by manually operated devices.

As here shown a foot lever 9 is connected by a rod 10 and lever 11 with the brake band and enables the operator to manually control the rotation of the shipper-shaft.

In the ordinary construction of the excavating mechanism there will be two controlling members 7 arranged on opposite sides of the pinions 4, but it will be obvious that the number of brake wheels is immaterial and that the invention can be applied to a shipper-shaft equipped with one or more of such brake wheels.

Rotary movement is imparted to the shipper-shaft through the controlling member 7 by means of suitable power mechanism which is preferably mounted on the boom and is here shown as the usual crowding engine 12. This engine is connected with the brake wheel or controlling member 7 by suitable friction clutch devices and the shaft may be positively moved in either direction by the power mechanism or it may be held against movement either by the power mechanism operating through the clutch devices and brake wheel or by the manually operated devices coöperating with the brake wheel, or by both the power mechanism and the manually operated devices. In the construction of the device here illustrated the clutch mechanism comprises an internal gear 13 rotatably supported on the shaft 2 adjacent to the brake wheel and meshing with a pinion 28 on a shaft 29 of the crowding engine. This gear is preferably journaled on an inwardly extending portion of the hub 14 of the brake wheel and is provided on its outer periphery with a friction surface and thus constitutes a friction drum as well as a driving gear. A flexible friction band 16 extends about the friction surface 15 and is controlled by suitable operating mechanism which is preferably mounted on the brake wheel. As here shown this operating mechanism comprises a steam-operated ram 17 connected by a lever 18 with the brake band. The steam supply conduit for the ram extends through the shipper-shaft, as indicated at 19, and thus enables the ram to be operated without interfering with the rotation of the brake wheel or shaft.

With this construction it will be apparent that the shipper-shaft and dipper may be actuated through the gear 13, friction device and brake wheel from the crowding engine; that when the dipper has been loaded it may be held against movement and its descent by gravity controlled either by the foot brake or by holding the gear 13 against movement and manipulating the ram 17 to control the movement of the shaft. When the load has been dumped and it is desired to drop the dipper it is only necessary to release the friction band from the friction drum and the dipper may drop by gravity and the only parts of the operating mechanism which will be affected will be the shipper-shaft and the brake wheel. This is an important feature inasmuch as dipper handles are often of great length. To allow the dipper to descend by gravity at a high speed while connected with the engine would be liable to seriously injure the latter. To lower the dipper at a speed commensurate with the proper operation of the engine would consume much valuable time. With the present arrangement of the controlling mechanism, the dipper can be lowered at as high speed as may be desired, and, as above explained, no movement will be transmitted to the engine. Further, it will be noted that by this construction the crowding mechanism and friction devices are in a single unit, yet each retains all of its individual advantages.

To quickly release the friction band from the friction drum and to prevent the same from dragging thereon we have preferably mounted on the brake wheel suitable resilient devices which are connected with the friction band and tend to move the same outward away from the friction drum as soon as the operating mechanism for the friction drum has been released. These resilient devices may be of any suitable character. As here shown each comprises a flat or leaf spring 20 connected at its opposite ends to the friction drum and extending about the outer side of a projection 21 carried by the brake wheel. The projection 21 is here shown as comprising a pin having one end extending through a lug 22 on the inner periphery of the rim of the brake wheel and secured therein by means of a cotter pin 23 or other suitable fastening device. The pin is provided with an annular groove 24 which forms a recess to receive the spring 20, center the same and hold it against lateral movement. The flat spring is preferably pivotally connected at one end to the band, as indicated at 25, and has its opposite end connected thereto by inserting said end between lugs 26 and securing it therein by means of a pin 27. The tension of the springs 20 is sufficient to move the friction band outward when the operating mechanism is released, but is not sufficient to offer any material resistance to the operation of this mechanism. By the use of these devices the friction band is quickly moved out of engagement with the friction drum when the operating mechanism is released and is prevented from dragging on the drum.

The operation of the device will be readily understood from the foregoing description thereof and it will be apparent that we have provided a controlling mechanism for shipper-shafts which is exceedingly flexible and will enable the shipper-shaft to be very easily controlled, and by means of which the dipper may be retained in its elevated position during the conveying and dumping period. It will further be apparent that the mechanism here produced is of a very compact arrangement and is of such a simple, strong construction that it is not liable to become disarranged or broken.

While we have herein shown and described one embodiment of our invention it will be understood that this has been chosen for the purpose of illustration only and that we do not desire to be limited to the details of construction shown and described, for obvious modifications will occur to a person skilled in the art.

Having thus fully described our invention, what we claim as new and desire to secure by Letters Patent, is:—

1. The combination with a rotatable member, a brake mechanism comprising a drum rigidly connected with said rotatable member and a device coöperating with said brake drum to control the rotation of said rotatable member, power mechanism, and a clutch device to connect said power mechanism with said brake drum, of operable means to cause said brake mechanism and said clutch to operate either separately or in unison.

2. In a mechanism of the character described, a shaft, a brake comprising a brake drum secured to said shaft and an operable device coöperating with said drum to control the rotation of said shaft, power mechanism, a clutch member rotatably mounted on said shaft and operatively connected with said power mechanism, a second clutch member connected to and rotatable with said brake drum, and an operable device to move one of said clutch members into operative relation with the other of said clutch members, said operable device being operable to cause said clutch to operate either separately from or in unison with said brake.

3. The combination with an engine, a shaft, a friction drum loosely mounted on said shaft and geared to said engine and a part to be operated connected with said shaft, of a brake comprising a drum secured to said shaft for rotation therewith, a friction band carried by said brake drum and extending about said friction drum, a power-operated device mounted on said brake drum to actuate said friction band, a brake band extending about said brake drum, and means to cause said brake band to operate either in unison with or independently of said friction band, whereby said shaft and said part to be operated may be actuated by said engine, or may have movement independent of said engine under the control of said brake mechanism, or may be controlled by the joint action of said engine and said brake mechanism.

4. In a mechanism of the character described, a shaft, a brake comprising a drum secured to said shaft and devices coöperating with said drum to control the rotation of said shaft, power mechanism, a friction drum rotatably mounted on said shaft and operatively connected with said power mechanism, a friction band extending about said friction drum and connected to and rotatable with said brake drum, means to cause said friction band to operatively engage said friction drum either in unison with or independently of the operation of said brake, and other means to move said friction band away from said friction drum.

5. In a mechanism of the character described, a shaft, a brake comprising a drum secured to said shaft and devices coöperating with said drum to control the rotation of said shaft, power mechanism, a friction drum rotatably mounted on said shaft and operatively connected with said power mechanism, a friction band extending about said friction drum and connected to and rotatable with said brake drum, means to cause said friction band to operatively engage said friction drum either in unison with or independently of the operation of said brake, and resilient devices carried by said brake drum, connected with said friction band and tending normally to move said friction band into an inoperative position.

6. In a mechanism of the character described, a boom, a shipper shaft rotatably mounted on said boom, and dipper actuating devices carried by said shipper shaft, of brake drums rigidly secured to said shaft on opposite sides of said dipper-actuating devices, brake bands coöperating with said drums, friction drums rotatably mounted about said shaft adjacent to the respective brake drums, friction bands extending about said friction drums and secured to the respective brake drums, an engine, geared connections between said engine and said friction drums, and means for manipulating said friction band and said brake bands to enable said shipper shaft to be positively driven in either direction by said engine, to be disconnected from said engine and controlled by said brake mechanism or to be controlled by both the engine and the brake mechanism.

7. In a mechanism of the character described, a boom, a shipper shaft rotatably mounted on said boom, and dipper actuating devices carried by said shipper shaft, of a brake mechanism comprising a part rigidly secured to said shaft, a clutch mechanism comprising a part rotatably mounted about said shaft and a second part secured to that part of said brake mechanism which is secured to the shaft, an engine, a driving connection between said engine and the first-mentioned part of said clutch mechanism, and means for controlling said clutch mechanism and said brake mechanism to enable said shipper shaft to be positively driven in either direction by said engine, to be disconnected from the engine and controlled by said brake mechanism, or to be controlled by both the brake mechanism and the engine.

In testimony whereof, we affix our signatures in presence of two witnesses.

CHARLES B. KING.
HARVEY T. GRACELY.

Witnesses:
W. G. SLACK,
C. B. WESTON.

Copies of this patent may be obtained for five cents each, by addressing the "Commissioner of Patents, Washington, D. C."